(12) United States Patent
Ueno et al.

(10) Patent No.: US 8,308,431 B2
(45) Date of Patent: Nov. 13, 2012

(54) TURBOCHARGER

(75) Inventors: Hiroshi Ueno, Tondabayashi (JP); Toshihiko Shiraki, Yao (JP); Akio Oshima, Neyagawa (JP); Tomonori Nakashita, Suita (JP); Masaaki Ohtsuki, Kashihara (JP); Shigenori Bando, Nara (JP); Masaki Abe, Kashiwara (JP); Ryuji Nakata, Osaka (JP); Takehisa Kida, Izumisano (JP)

(73) Assignee: Jtekt Corporation, Osaka-Shi, Osaka (JP)

( * ) Notice: Subject to any disclaimer, the term of this patent is extended or adjusted under 35 U.S.C. 154(b) by 1408 days.

(21) Appl. No.: 11/905,365

(22) Filed: Sep. 28, 2007

(65) Prior Publication Data

US 2008/0080966 A1  Apr. 3, 2008

(30) Foreign Application Priority Data

Sep. 29, 2006  (JP) ................................. 2006-268921

(51) Int. Cl.
 *F04D 29/05* (2006.01)
 *F04D 29/58* (2006.01)
(52) U.S. Cl. .................. 415/178; 415/216.1; 416/204 R
(58) Field of Classification Search .................. 415/177, 415/178, 216.1; 416/204 R
 See application file for complete search history.

(56) References Cited

U.S. PATENT DOCUMENTS

| | | | | |
|---|---|---|---|---|
| 2,441,432 A * | 5/1948 | McGee | ......................... | 416/188 |
| 2,668,006 A * | 2/1954 | Larrecq | ......................... | 416/171 |
| 2,799,445 A * | 7/1957 | Hull | .............................. | 416/188 |
| 4,281,941 A * | 8/1981 | Rottenkolber | .................. | 403/29 |
| 4,417,855 A * | 11/1983 | Jepsen | ...................... | 416/244 A |
| 4,482,303 A | 11/1984 | Acosta | | |
| 4,538,969 A * | 9/1985 | Ammann et al. | ............. | 417/407 |
| 4,725,206 A | 2/1988 | Glaser et al. | | |
| 4,786,238 A | 11/1988 | Glaser et al. | | |
| 4,915,589 A * | 4/1990 | Gessler et al. | ............ | 416/241 B |
| 4,997,341 A * | 3/1991 | Lorett | .......................... | 415/110 |
| 5,087,176 A * | 2/1992 | Wieland | ........................ | 417/407 |
| 5,163,816 A * | 11/1992 | Goetzke et al. | ........... | 416/204 A |
| 5,228,836 A * | 7/1993 | Eichhorn et al. | .......... | 416/244 R |
| 5,297,928 A * | 3/1994 | Imakiire et al. | ............... | 415/112 |
| 5,961,247 A * | 10/1999 | Gold et al. | .................... | 403/369 |
| 6,164,931 A * | 12/2000 | Norton et al. | ................. | 417/407 |
| 6,481,970 B2 * | 11/2002 | Mukherjee et al. | ....... | 416/204 A |

(Continued)

FOREIGN PATENT DOCUMENTS

JP  61-019602  2/1986

(Continued)

OTHER PUBLICATIONS

Notification of Reason(s) for Refusal dated Apr. 11, 2011 (dispatched on Apr. 19, 2011), with English translation.

(Continued)

*Primary Examiner* — Edward Look
*Assistant Examiner* — Sean J Younger
(74) *Attorney, Agent, or Firm* — McGinn IP Law Group, PLLC (57) ABSTRACT

A turbocharger includes a turbine wheel having a center hole and a turbine shaft having one end secured on a small-diameter inner circumferential surface of the center hole. A large-diameter inner circumferential surface and a large diameter outer circumferential surface are formed to provide a cylindrical clearance opening toward a bearing housing between the center hole and the outer circumferential surface of the turbine shaft.

13 Claims, 7 Drawing Sheets

U.S. PATENT DOCUMENTS

| | | | |
|---|---|---|---|
| 6,948,913 B2 * | 9/2005 | Heyes et al. | 416/204 R |
| 6,994,526 B2 * | 2/2006 | Furman et al. | 416/244 A |
| 7,241,416 B2 * | 7/2007 | Sweetland | 419/8 |
| 7,344,362 B2 * | 3/2008 | Kopp et al. | 417/407 |
| 7,374,402 B2 * | 5/2008 | Thiele et al. | 416/204 R |
| 2004/0126231 A1 * | 7/2004 | Billington | 415/216.1 |
| 2004/0126251 A1 * | 7/2004 | Billington | 417/407 |

FOREIGN PATENT DOCUMENTS

| | | |
|---|---|---|
| JP | 61-057140 | 4/1986 |
| JP | 61-84101 | 6/1986 |
| JP | 61-169241 | 10/1986 |
| JP | 63-141 | 1/1988 |
| JP | 3-260330 (A) | 11/1991 |
| JP | 07-189724 | 7/1995 |
| JP | 2002-106569 | 4/2002 |
| JP | 2005-098267 | 4/2005 |

OTHER PUBLICATIONS

European Search Report dated Aug. 6, 2009.
Notification of Reasons for Refusal dated Jun. 12, 2012, with English-language translation.

* cited by examiner

TURBOCHARGER

BACKGROUND OF THE INVENTION

The present invention relates to a turbocharger.

Some automobile engines employ turbochargers which compress air supplied to the engines using the pressure of exhaust gas to provide high power. Such turbochargers include turbochargers having a turbine shaft accompanied by a turbine wheel secured to one end thereof and a compressor impeller secured to another end thereof, a bearing device rotatably supporting the turbine shaft, and a bearing housing that houses the bearing device with the turbine wheel and the compressor impeller being exposed on both end surfaces in the axial direction thereof.

A turbocharger is configured to convert the pressure of exhaust gas into a rotational force using the turbine wheel and to compress air to be supplied to the engine using the compressor impeller which is rotated integrally with the turbine wheel by the turbine shaft. The turbine wheel is heated to a very high temperature because it is directly exposed to exhaust gas at a high temperature. The heat of the turbine wheel at the elevated temperature is transferred to the bearing device to increase the temperature of the same. The state of lubrication of the bearing device is consequently deteriorated, which can result in seizure of the device to reduce the durability of the same. For this reason, a turbocharger as described above normally has a configuration in which an engine oil or engine cooling water is circulated in the bearing housing containing the bearing device to cool the bearing device.

In addition to a cooling mechanism as described above, measures have been taken including the provision of a heat shield plate that is disposed between the turbine wheel and the bearing housing to prevent the heat of the turbine wheel from being transferred to the bearing device through the bearing housing (for example, see JP-A-2002-106569, JP-A-7-189724).

In the examples of the related art, although an extremely great temperature rise at the bearing device can be prevented by cooling the device with cooling water or using a heat shield plate, the suppression of a temperature rise is still insufficient in view of the durability of the bearing device to be maintained. Strong demands therefore remain for more effective measures to suppress a temperature rise at a bearing device for suppressing reduction in the durability of the bearing device.

SUMMARY OF THE INVENTION

The invention was made taking such a situation into consideration, and it is an object of the invention to provide a turbocharger in which a temperature rise at a bearing device supporting a turbine shaft can be effectively suppressed to suppress reduction in durability.

(1) In order to achieve the object, the invention provides a turbocharger comprising:

a turbine wheel including a center hole coaxial with a rotation center thereof, the center hole including a shaft support portion;

a turbine shaft inserted through the center hole, one end of the turbine shaft being secured to the shaft support portion;

a bearing device that rotatably supports the turbine shaft;

a bearing housing that houses the bearing device with the turbine wheel being exposed at one end surface in an axial direction thereof; and a turbine housing secured to an end surface of the bearing housing in the axial direction thereof to enclose the turbine wheel, wherein a cylindrical clearance is formed between the center hole and an outer circumferential surface of the turbine shaft, the clearance opening toward the bearing housing at one end thereof.

In the turbocharger having the above-described configuration, the cylindrical clearance is formed between the center hole of the turbine wheel and the outer circumferential surface of the turbine shaft. Therefore, the area of contact between the turbine wheel and the turbine shaft can be smaller than that in a case, for example, wherein the turbine wheel is secured such that the inner circumferential surface thereof at the center hole contacts the outer circumferential surface of the turbine shaft throughout the axial length of the surface. Since it is therefore possible to reduce the efficiency of thermal conduction between the turbine wheel that is heated by exhaust gas and the turbine shaft, the quantity of heat transferred to the bearing device through the turbine shaft can be also reduced. As a result, a temperature rise at the bearing device can be suppressed.

(2) Preferably, the turbocharger according to the aspect (1) further comprising a heat shield member that includes a main body portion disposed between an end of the bearing housing in the axial direction and the turbine wheel to serve as a heat shield therebetween, and a cylindrical portion disposed to extend from the main body portion in the cylindrical clearance so as to cover an outside of the turbine shaft to serve as a heat shield between the turbine shaft and the turbine wheel.

In this case, since the cylindrical portion blocks heat radiated from the inner circumferential surface of the turbine wheel, which is a source of heat, at the center hole thereof toward the outer circumferential surface of the turbine shaft, a temperature rise at the turbine shaft can be suppressed. Further, heat radiated from the turbine wheel toward the bearing housing can be blocked by the main body portion of the heat shield member to suppress a temperature rise at the bearing housing. Since a temperature rise at the bearing housing and the turbine shaft attributable to heat radiated from the turbine wheel can be suppressed by the heat shield member as thus described, it is possible to reduce the quantity of heat transferred to the bearing device through the bearing housing and the turbine shaft.

In a turbocharger according to the aspect (2), an outer circumferential edge of the main body portion of the heat shield member is interposed between a peripheral part of one end surface of the bearing housing and a peripheral part of one end surface of the turbine housing.

In this case, the heat shield member can be easily secured. The heat shield member can be interposed between the turbine housing, which undergoes a temperature rise, and the bearing housing by interposing the heat shield member between those elements. Thus, the efficiency of thermal conduction from the turbine housing to the beating housing can be reduced to reduce the quantity of heat transferred to the bearing device.

In a super charge according to the item (1), a sleeve made of a material having a low thermal conductivity is interposed between the center hole and the outer circumferential surface of the turbine shaft.

In this case, the sleeve made of a material having a low thermal conductivity reduces the efficiency of thermal conduction from the turbine wheel to the turbine shaft, which allows the quantity of heat transferred to the bearing device through the turbine shaft to be reduced.

A hole may be formed at one end of the turbine shaft, the hole opening on the end surface of the turbine shaft and extending in the axial direction thereof.

In this case, since the hole constitutes an air gap in one end of the turbine shaft, the substantial heat capacity of that end can be reduced. The quantity of heat transferred from the turbine wheel to the turbine shaft can therefore be reduced, and the quantity of heat transferred to the bearing device can be reduced consequently.

A filler member made of a material having a low thermal conductivity may be fitted into the hole to fill the hole. In this case again, the substantial heat capacity of one end of the turbine shaft can be reduced. Further, the filler member can suppress reduction in the strength of the end of the turbine shaft.

The invention provides a turbocharger comprising;

a turbine shaft having one end to which a turbine wheel is secured and the other end to which a compressor impeller is secured;

a bearing device that rotatably supports the turbine shaft; and a bearing housing that houses the bearing device with the turbine wheel and the compressor impeller being exposed on opposite end surfaces in the axial direction thereof, wherein the bearing housing is formed with an air blast path for guiding compressed air compressed by the compressor impeller to an intermediate part of the turbine shaft between the turbine wheel and the bearing device to cool the intermediate part with an air blast.

In the turbocharger having the above-described configuration, even when heat transferred from the turbine wheel to the turbine shaft reaches the intermediate part of the turbine shaft to increase the temperature of the intermediate part, the intermediate part can be cooled by the compressed air from the compressor. That is, the heat transferred from the turbine wheel can be reduced before it reaches the bearing device. As a result, a temperature rise at the bearing device can be effectively suppressed.

The intermediate part is preferably formed with a chamber into which the compressed air is guided.

In this case, since the compressed air guided to the intermediate part can be put in contact with an inner sidewall of the chamber, a contact area, i.e., the area over which the compressed air contacts the intermediate part can be increased. Therefore, the intermediate part can be more effectively cooled, and a further reduction can be achieved in the quantity of heat transferred to the bearing device.

In a turbocharger according to the invention, a temperature rise at the bearing device supporting the turbine shaft can be effectively suppressed. Therefore, reduction in the durability of the turbocharger can be suppressed.

DESCRIPTION OF PREFERRED EMBODIMENTS

Figure 1:
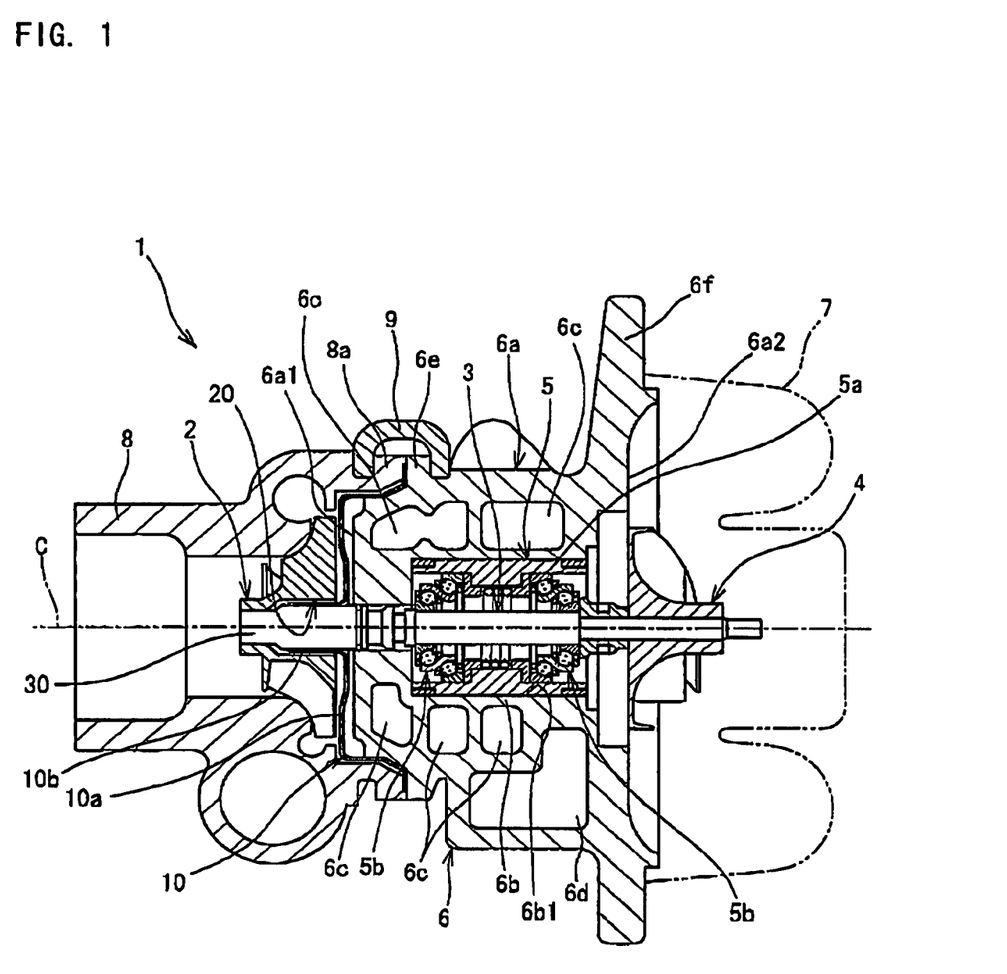
FIG. 1 is a sectional view of a turbocharger which is a first embodiment of the invention.

A preferred embodiment of the invention will now be described with reference to the accompanying drawings. FIG. 1 is a sectional view of a turbocharger which is a first embodiment of the invention.

Referring to FIG. 1, a turbocharger 1 is used in an automobile engine. The turbocharger includes a turbine shaft accompanied by a turbine wheel 2 secured to one end thereof for converting the pressure of exhaust gas from the engine into a rotational force and a compressor impeller 4 secured to another end thereof for compressing air, a bearing device 5 for rotatably supporting the turbine shaft 3, and a bearing housing 6 that houses the bearing device 5.

The bearing housing 6 has a main body portion 6a having a substantially cylindrical outer circumference, and a journal 6b formed with a center hole 6b1 centered at an axis C is provided in a central part of the main body portion 6a in the radial direction thereof. The bearing device 5 for rotatably supporting the turbine shaft 3 as described above is disposed in the center hole 6b1.

The bearing device 5 is disposed in the center hole 6b1 as described above and housed in the bearing housing 6. The bearing device is constituted by a sleeve 5a inserted through the center hole 6b1 and a pair of roller bearings 5b disposed on an inner circumference side of the sleeve 5a at a predetermined interval in the axial direction. The bearing device 5 supports the turbine shaft 3 such that it can rotate about the axis C with the pair of roller bearings 5b.

The bearing housing 6 houses the bearing device 5 such that the turbine wheel 2 is exposed at one end surface 6a1 of the main body portion 6a and such the compressor impeller 4 is exposed at another end surface 6a2.

A cooling water jacket 6c is formed in the main body portion 6a of the bearing housing 6. The cooling water jacket 6c is a water channel into which engine cooling water is introduced and which is formed in a spiral shape so as to surround the outer circumference of the journal 6b. The main body portion 6a is formed with a water inlet/outlet port for introducing and discharging the engine cooling water to and from the cooling water jacket 6c. The engine cooling water is circulated in the cooling water jacket 6c by introducing and discharging the cooling water through the water inlet/outlet port, and the bearing housing 6 and the bearing device 5 disposed in the journal 6b are cooled by the cooling water.

In addition to the cooling water jacket 6c, a tank portion 6d for storing a lubricating oil to be supplied to the bearing device 5 is formed in the main body portion 6a. The lubricating oil stored in the tank portion 6d can be supplied to the bearing device 5 through a lubricating oil supplying mechanism which is not shown. The bearing device 5 is lubricated only by the lubricating oil from the tank portion 6d.

First and second flange portions 6e and 6f are formed on outer peripheral surfaces of the main body portion 6a of the bearing housing 6 at one and another end of the main body portion, respectively, the flange portions extending outward in the radial direction of the main body portion. A compressor housing 7 is secured to the second flange portion 6f to enclose the compressor impeller 4 exposed at the end surface 6a2 of the main body portion 6a. A compression path for compressing air taken into the engine is formed in the compressor housing 7, and the compressor impeller 4 rotates to take outside air into the compression path and to compress it therein.

A turbine housing 8 is secured to the first flange portion 6e to enclose the turbine wheel 2 exposed at the end surface 6a1 of the main body portion 6a. The turbine housing 8 is formed with a flow path for exhaust gas from the engine, and the turbine wheel 2 is rotated by the exhaust gats whose flow rate is increased in the path.

Figure 2:
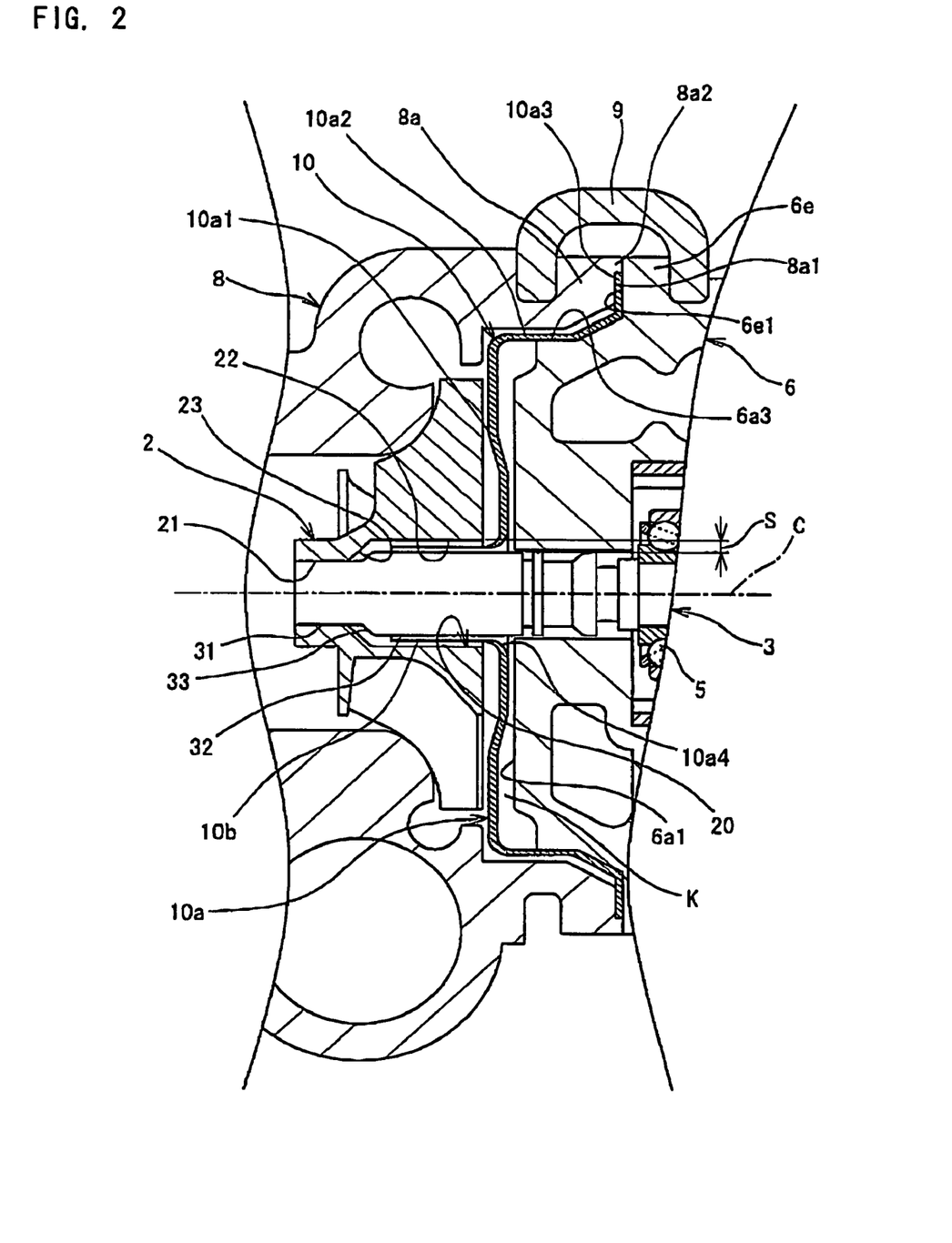
FIG. 2 is an enlarged sectional view of a region where a bearing housing and a turbine housing are connected.

FIG. 2 is an enlarged sectional view of the region where the bearing housing 6 and the turbine housing 8 are connected. The turbine housing 8 has a flange portion 8a formed at one end thereof, the flange portion 8a abutting on the first flange portion 6e of the main body portion 6a. A heat shield member 10 to be described later for blocking heat from the turbine wheel 2 is interposed between a flange surface 8a1 of the flange portion 8a that is located in an outer peripheral part of the end surface of the turbine housing 8 and a flange surface 6e1 of the first flange potion 6e that is located on an outer peripheral part of the end surface 6a1 of the bearing housing 6. Further, an annular protrusion 8a2 is formed at the peripheral edge of the flange portion 8a to protrude from the flange surface 8a1 in the axial direction. The tip of the protrusion 8a2 abuts on the flange surface 6e1 of the first flange portion 6e to position the turbine housing 8 relative to the beating housing 6 in the axial direction.

A clamp 9 for securing the flange portions 8a and 6e in the abutting state is attached to the outer peripheries of the flange portion 8a and the first flange portion 6e. The clamp 9 urges substantially the entire peripheries of the flange portions 8a and 6e in the direction of causing them to abut on each other in the axial direction. The bearing housing 6 and the turbine housing 8 are rigidly secured to each other by the clamp 9.

A detailed description will now be made on the configuration of the region where the turbine wheel 2 and the turbine shaft 3 are secured to each other.

Referring to FIG. 2, a small-diameter outer circumferential surface 31 is formed at one end of the turbine shaft 3, the turbine wheel 2 externally fitting the surface 31 in contact therewith. A large-diameter outer circumferential surface 32 greater in diameter than the small-diameter outer circumferential surface 31 is formed in the direction toward the bearing housing 6 when viewed from the small-diameter outer circumferential surface 31 with an inclined surface 33 interposed to connect those surfaces.

The turbine wheel 2 is formed with a center hole 20 which is centered at an axis C serving as the center of rotation of the wheel, and the turbine shaft 3 is inserted through the center hole 20. A small-diameter inner circumferential surface 21 is formed to define part of the center hole 20, the surface 21 serving as a shaft supporting portion to which the turbine shaft 3 is inserted and secured by means of welding with a small-diameter outer circumferential surface 31 of the shaft in contact with the surface 21. The small-diameter inner circumferential surface 21 is provided such that the position of the same in the axial direction substantially agrees with the position of the small-diameter outer circumferential surface 31 of the turbine shaft 3. A large-diameter inner circumferential surface 22 greater in diameter than the small-diameter inner circumferential surface 21 is formed in the direction toward the bearing housing 6 when viewed from the small-diameter inner circumferential surface 21, an inclined surface 23 being interposed to connect those surfaces.

The large-diameter inner circumferential surface 22 is formed to have a diameter greater than that of the larger diameter outer circumferential surface 32 to form a cylindrical clearance S between the large-diameter inner circumferential surface 22 and the large-diameter outer circumferential surface 32. The cylindrical clearance S formed between the large-diameter inner circumferential surface 22 and the large-diameter outer circumferential surface 32 extends in the axial direction from a bottom part thereof formed by the inclined surface 33 of the turbine shaft 3 and the inclined surface 23 defining the center hole 20, and an end of the clearance opens toward the bearing housing 6.

As shown in FIG. 2, the turbine wheel 2 is disposed at a predetermined axial interval from the end surface 6a1 of the main body portion 6a to provide a space K between them. Therefore, the cylindrical clearance S opening toward the bearing housing 6 continues to the space K.

A layer of air existing in the space K makes it possible to block heat radiated toward the bearing housing 6 from the turbine wheel 2 which is heated by being exposed to exhaust gas.

The above-described heat shield member 10 is disposed in the space K and the cylindrical clearance S which are continuous with each other. The heat shield member 10 includes a main body portion 10a which is disposed in the space K and a cylindrical portion 10b which extends from the main body portion 10a in the axial direction to be disposed in the cylindrical clearance S.

For example, the heat shield member 10 is provided by forming the main body portion 10a and the cylindrical portion 10b integrally with each other by press-molding a plate made of a metal material having high heat resistance. The main body portion 10a is a member which is disposed in the space K as described above to serve as a heat shield between the turbine wheel 2 and the bearing housing 6. The portion 10a is formed with a disc part 10a1 located in the space K, a cylindrical part 10a2 extending from the peripheral edge of the disc part 10a1 toward the first flange portion 6e of the bearing housing 6, and a bent part 10a3 provided by bending the cylindrical part 10a2 outwardly in the radial direction, the bent part contacting the flange surface 6e1 of the first flange portion 6e.

The bent part 10a3 constituting an outer circumferential edge of the main body portion 10a is interposed between the flange surface 8a1 of the flange portion 8a provided on the turbine housing 8 and the flange surface 6e1 of the first flange portion 6e as described above. The bent part 10a3 is formed to have a thickness slightly greater than the width of a gap formed between the flange surface 8a1 and the flange surface 6e1. Thus, the bent part 10a3 is firmly held in contact with the flange surfaces 8a1 and 6e1 by interposing it between the flange surfaces 8a1 and 6e1. The heat shield member 10 is secured between the turbine housing 8 and the bearing housing 6 and disposed in the space K and the cylindrical clearance S by interposing the bent part 10a3 between the flange surfaces 8a1 and 6e1.

Since the bent part 10a3 (heat shield member 10) can be interposed between the turbine housing 8 and the bearing housing 6 by interposing the bent part 10a3 between the housings, the efficiency of thermal conduction from the turbine housing 8 to the bearing housing 6 can be reduced. Thus, even when the temperature of the turbine housing 8 is increased as a result of exposure to exhaust gas, the quantity of heat transferred from the turbine housing 8 to the bearing housing 6 and the bearing device 5 can be reduced.

The cylindrical part 10a2 which is continuous with the bent part 10a3 is formed such that it externally fits a side surface 6a3 of the first flange portion 6e connecting the flange surface 6e1 and the end surface 6b.

The disc part 10a1 is formed with a hole 10a4 in the middle thereof, and the turbine shaft 3 is inserted in the hole. The disc part 10a1 is disposed between the turbine wheel 2 and the bearing housing 6 to block heat radiated from the turbine wheel 2.

The cylindrical portion 10b extends in the axial direction toward the turbine wheel 2 from the circumferential edge of the disc part 10a1 defining the hole 10a4, the circumferential edge constituting a base end of the portion 10b. The cylindrical portion 10b is disposed in the cylindrical clearance S to cover the large-diameter outer circumferential surface 32 of the turbine shaft 3, and the tip of this portion extends into the neighborhood of the inclined surfaces 23 and 33 defining the cylindrical clearance S. Thus, the cylindrical portion 10b is disposed to extend substantially throughout the clearance S in the axial direction, whereby a heat shield is provided between the turbine shaft 3 and the turbine wheel 2.

In the turbocharger 1 having the above-described configuration, the cylindrical clearance S is formed between the inner circumferential surface of the turbine wheel 2 defining the center hole 20 and the large-diameter outer circumferential surface 32 of the turbine shaft 3. Therefore, the area of contact between the turbine wheel 2 and the turbine shaft 3 can be smaller than that, for example, in a case wherein the entire inner circumferential surface defining the center hole 20 is secured in contact with the outer circumferential surface of the turbine shaft 3. It is therefore possible to reduce the efficiency of thermal conduction between the turbine wheel 2 which is heated by exhaust gas and the turbine shaft 3, and the quantity of heat transferred to the bearing device 5 through the turbine shaft 3 can be reduced. As a result, a temperature rise at the bearing device 5 can be suppressed to suppress reduction in the durability of the turbocharger 1.

In the present embodiment, heat radiated from the large-diameter inner circumferential surface 22 defining the center hole 20 of the turbine wheel 2 that is a source of heat toward the large-diameter outer circumferential surface 32 of the turbine shaft 3 can be blocked by the cylindrical portion 10b of the heat shield member 10, and a heat transfer attributable to convection of air in the cylindrical clearance S can be also prevented. Therefore, a temperature rise at the turbine shaft 3 can be suppressed. The main body portion 10a of the heat shield member 10 blocks heat radiated from the turbine wheel 2 toward the bearing housing 6, which makes it possible to suppress a temperature rise at the bearing housing 6. As described above, the heat shield member 10 makes it possible to suppress a temperature rise at the bearing housing 6 and the turbine shaft 3 attributable to heat radiated from the turbine wheel 2. Thus, a further reduction can be achieved in the quantity of heat transferred to the bearing device 5 through the bearing housing 6 and the turbine shaft 3, and reduction in the durability of the turbocharger 1 can be suppressed more effectively.

Figure 3:
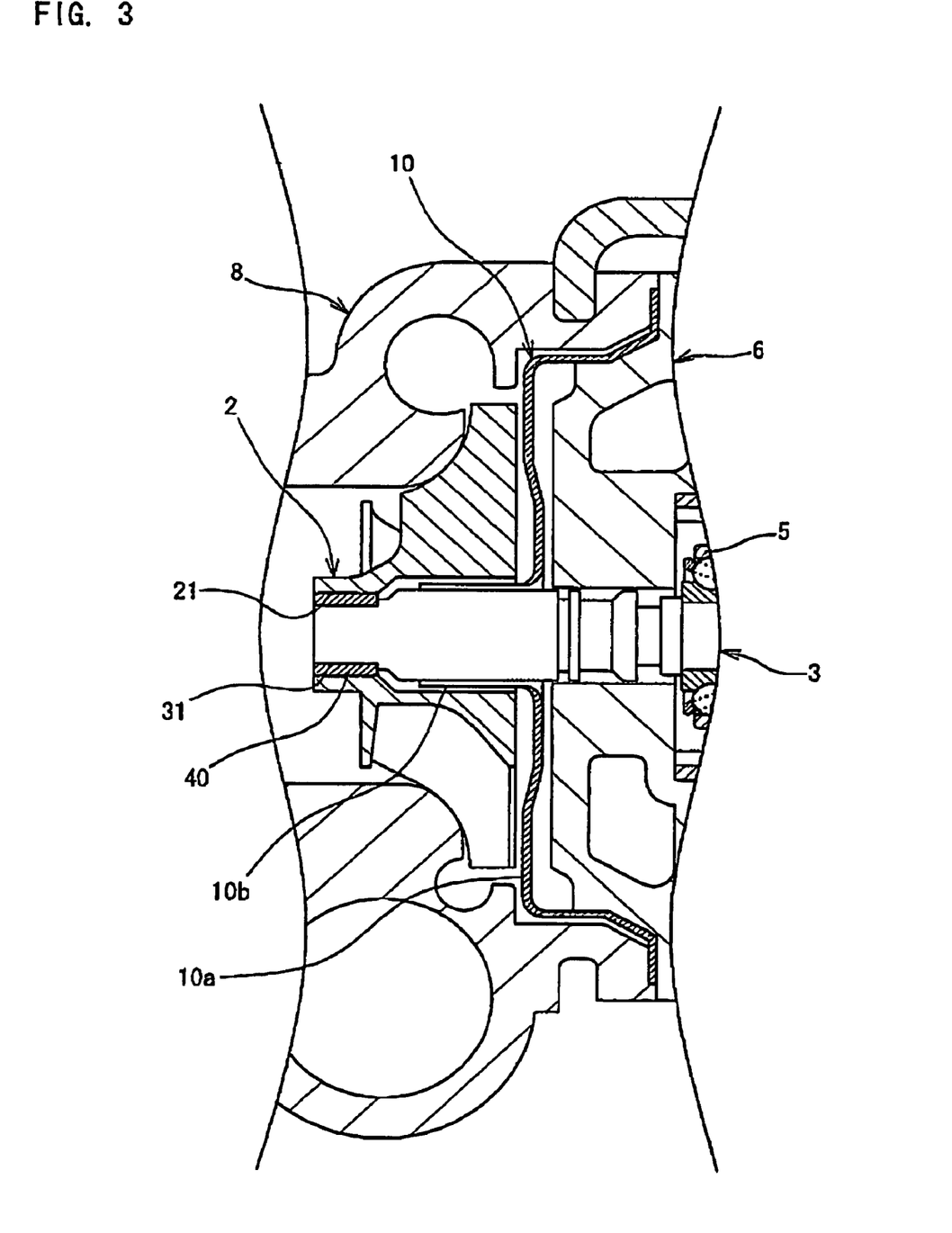
FIG. 3 is a sectional view of a major part of a supper charger which is a second embodiment of the invention.

FIG. 3 is a sectional view of major parts of a turbocharger 1 which is a second embodiment of the invention. A major difference of the present embodiment from the first embodiment is that an annular sleeve 40 is interposed between the small-diameter inner circumferential surface 21 defining the center hole 20 of the turbine wheel 2 and the small-diameter outer circumferential surface 31 of the turbine shaft 3. The present embodiment is otherwise similar to the first embodiment, and the description will omit points that are similar between the embodiments.

The sleeve 40 is formed using a material having a low thermal conductivity such as zirconia, and the turbine wheel 2 and the turbine shaft 3 are secured with the sleeve 40 made of a low thermal conductivity material interposed between them. In the turbocharger 1 of the present embodiment, therefore, the efficiency of thermal conduction from the turbine wheel 2 to the turbine shaft 3 can be made lower than that in a case wherein those elements are secured with the small-diameter inner circumferential surface 21 and small-diameter outer circumferential surface 31 kept in direct contact with each other just as in the first embodiment. As a result, a further reduction can be achieved in the quantity of heat transferred to the bearing device 5 through the turbine shaft 3.

Figure 4:
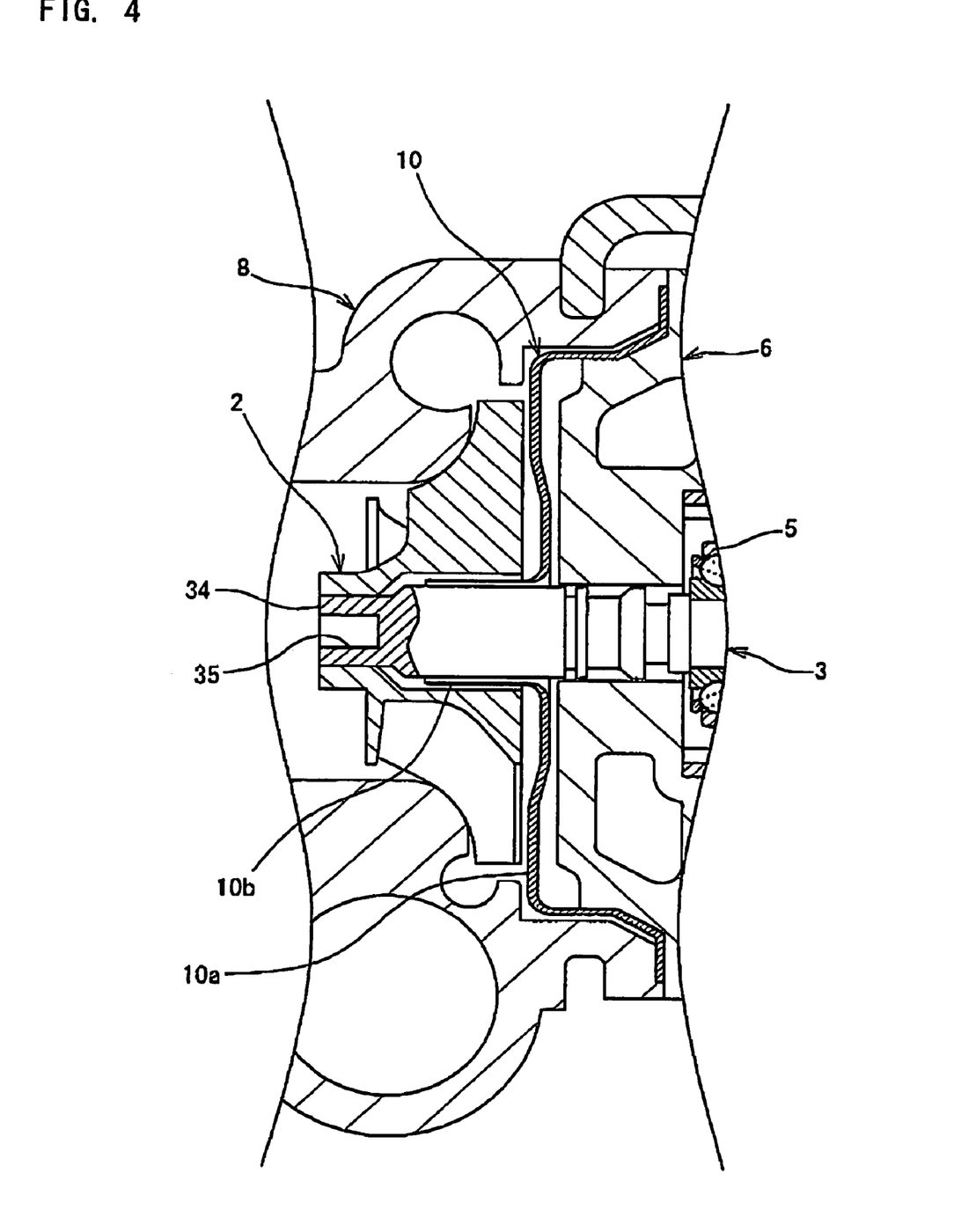
FIG. 4 is a sectional view of a major part of a supper charger which is a third embodiment of the invention.

FIG. 4 is a sectional view of major parts of a turbocharger 1 which is a third embodiment of the invention. A major difference of the present embodiment from the first embodiment is that one end of the turbine shaft 3 is formed with a hole 35 which opens on a tip end surface 34 of the turbine shaft 3 and extends in the axial direction of the shaft.

In this case, since the hole 35 constitutes an air gap in the end of the turbine shaft 3, the substantial heat capacity of the end of the turbine shaft 3 can be reduced. Therefore, the quantity of heat transferred from the turbine wheel 2 to the turbine shaft 3 can be reduced, and the quantity of heat transferred to the bearing device 5 can be consequently reduced.

Figure 5:
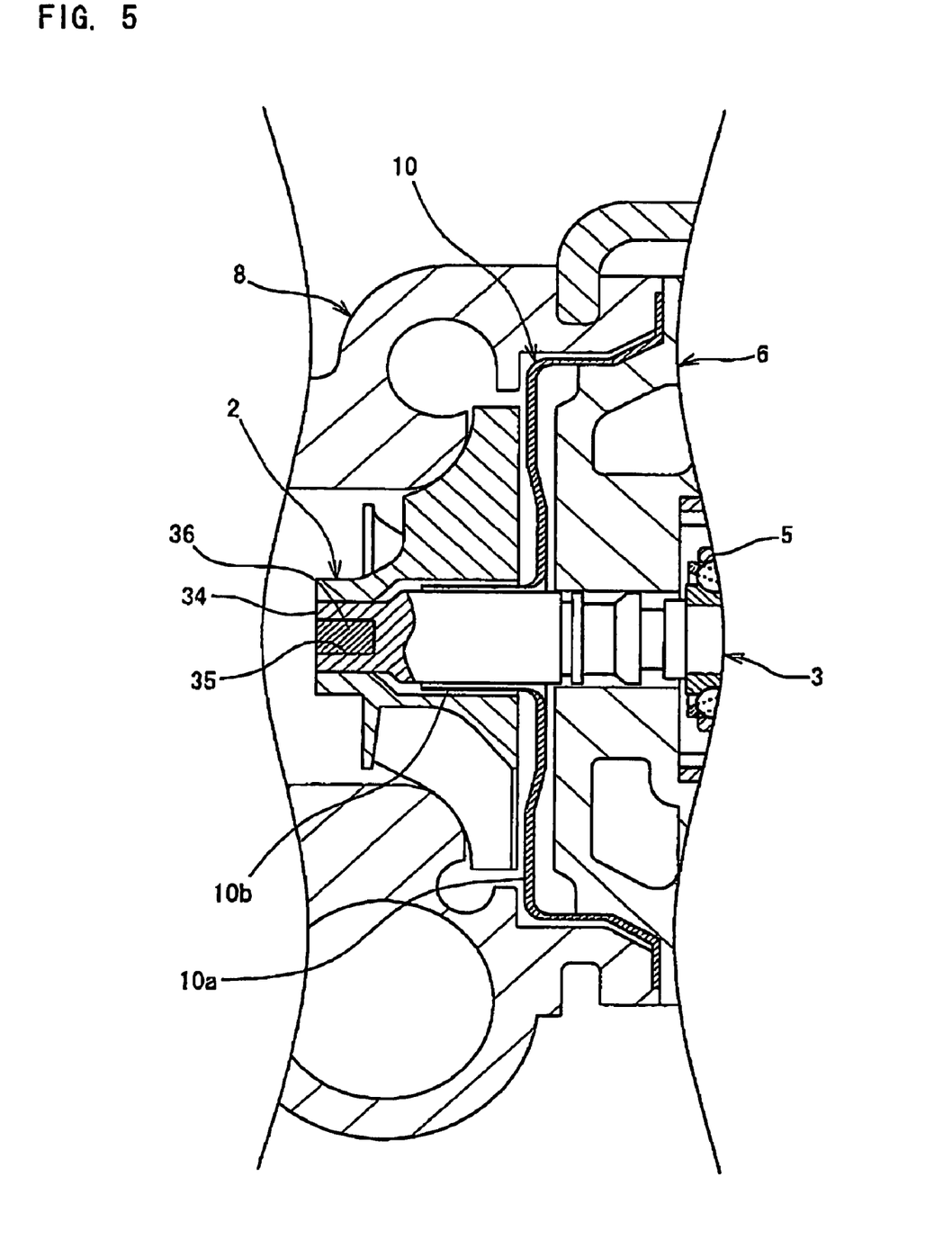
FIG. 5 is a sectional view of a major part of a modification of the supper charger according to the third embodiment of the invention.

As shown in FIG. 5, a filler member 36 may be fitted into the hole 35 to fill the hole 35. The filler member 36 is formed using a material having a low thermal conductivity such as zirconia. In this case again, the substantial heat capacity of one end of the turbine shaft 3 can be reduced. Further, the filler member 36 can suppress any reduction in the strength of the end of the turbine shaft 3 whose thickness is reduced because of the provision of the hole 35.

Figure 6:
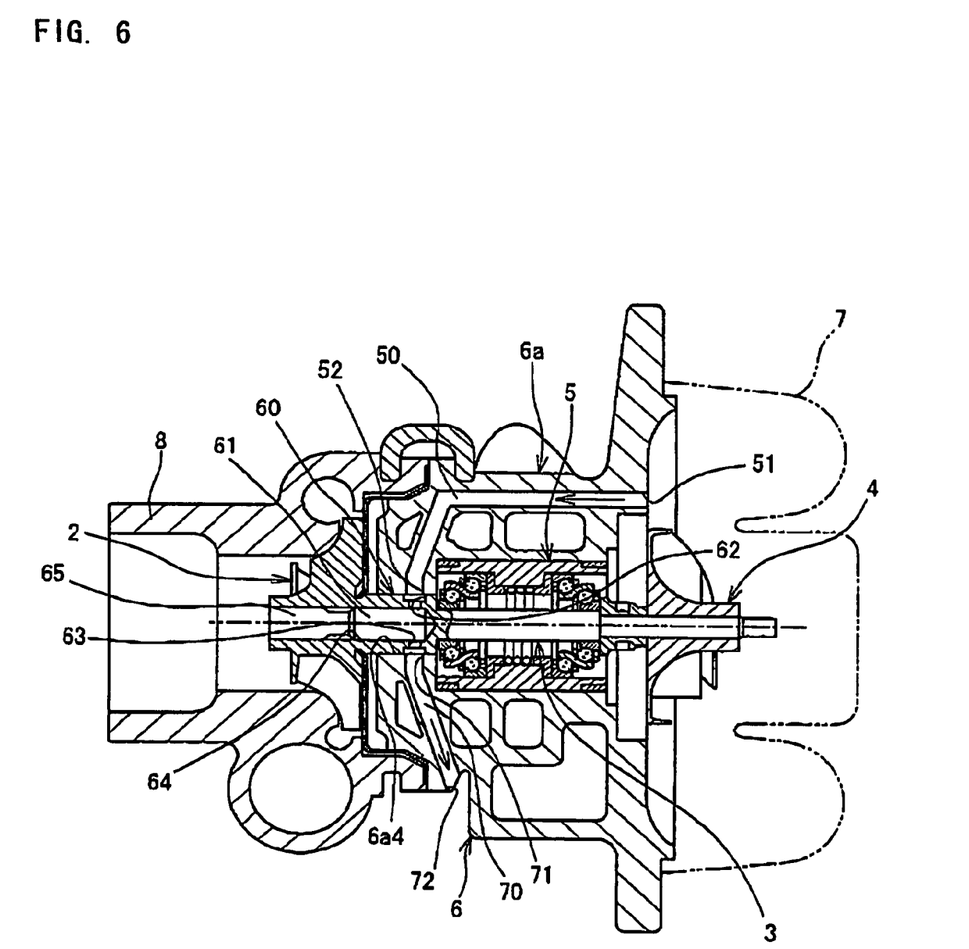
FIG. 6 is a sectional view of a major part of a supper charger which is a fourth embodiment of the invention.

FIG. 6 is a sectional view of a turbocharger 1 which is a fourth embodiment of the invention. A major difference of the present embodiment from the first embodiment is that an air blast path 50 for guiding compressed air compressed by a compressor impeller 4 to the turbine shaft 3 is provided in the bearing housing 6. Another difference is that the turbine shaft 3 and the turbine wheel 2 are formed integrally with each other, and a chamber 61 into which the compressed air is introduced is formed in the turbine shaft 3.

The air blast path 50 includes an opening 51 at one end thereof which opens on the end surface 6a2 of the main body portion 6a of the bearing housing 6 enclosed by the compressor housing 7 and an opening 52 at another end thereof which opens on an inner circumferential surface of the main body portion 6a defining an axial hole 6a4 into which the turbine shaft 3 is inserted. Thus, communication is established between the interior of the compressor housing 7 and the inside of the axial hole 6a4.

An intermediate part 60 between the turbine wheel 2 and the bearing device 5 of the turbine shaft 3 is located inside the axial hole 6a4. The above-described chamber 61 is formed in the intermediate part 60. The chamber 61 is formed by closing with a plug 65 an open end of a hole 64 formed to extend from an end surface of the turbine shaft 3 along the axis of the same.

The intermediate part 60 has a circumferential groove 62 formed on an outer circumferential surface thereof, the groove being in positional agreement with the opening 52 in the axial direction. A multiplicity of communication holes are also formed in a line in the circumferential direction to establish communication between the bottom of the circumferential groove 62 and the chamber 61.

Further, an air discharge path 70 is formed in the main body portion 6a, the path 70 including an opening 71 which opens on the inner circumferential surface defining the axial hole 6a4 and an opening 72 which opens on the exterior of the main body portion 6a. The opening 71 is provided to open into the axial hole 6a4 in substantially the same position as the opening 52 in the axial direction and opposite to the opening 52 about the axis.

In the turbocharger 1 having the above-described configuration, the compressed air in the compressor housing 7 is introduced into the air-blast path 50 through the opening 51 and guided to the inside of the axial hole 6a4 through the opening 52 to cool the intermediate part 60 with an air blast. The compressed air guided into the axial hole 6a4 is also introduced into the chamber 61 through the circumferential groove 62 and the communication holes 63. The compressed air is guided to the opening 71 of the air discharge path 70 through the circumferential groove 62 and the communication holes 63 again and discharged to the outside from the opening 72 through the air discharge path 70.

Seal members are provided on both sides of the circumferential groove 62 in the axial direction to prevent the compressed air from leaking toward the bearing device 5 and the turbine wheel 2.

In the super charge having the above-described configuration, even when heat from the turbine wheel 2 reaches the intermediate part 60 of the turbine shaft 3 to increase the temperature of the intermediate part 60, the intermediate part 60 can be cooled by a blast of the compressed air from the compressor impeller 4. That is, since the heat transferred from the turbine wheel 2 can be cooled before it reaches the bearing device 5, the quantity of heat transferred to the bearing device 5 can be reduced. As a result, a temperature rise at the bearing device 5 can be effectively suppressed to suppress any reduction in the durability of the turbocharger 1.

In the present embodiment, since the compressed air guided into the intermediate part 60 can be put in contact with an inner sidewall of the chamber 61, the contact area over which the compressed air contacts the intermediate part 60 can be increased. As a result, the intermediate part 60 can be more effectively cooled, and a further reduction can be achieved in the quantity of heat transferred to the bearing device 5.

A turbocharger according to the invention is not limited to the above-described embodiments. In the above-described embodiments, the cylindrical clearance S is formed by forming the larger-diameter inner circumferential surface 22 defining the center hole 20 and the larger-diameter outer circumferential surface 32 on the periphery of the turbine shaft 3. Alternatively, the cylindrical clearance S may be formed by changing the diameter of only either of the center hole 20 or the circumferential surface of the turbine shaft 3.

Figure 7:
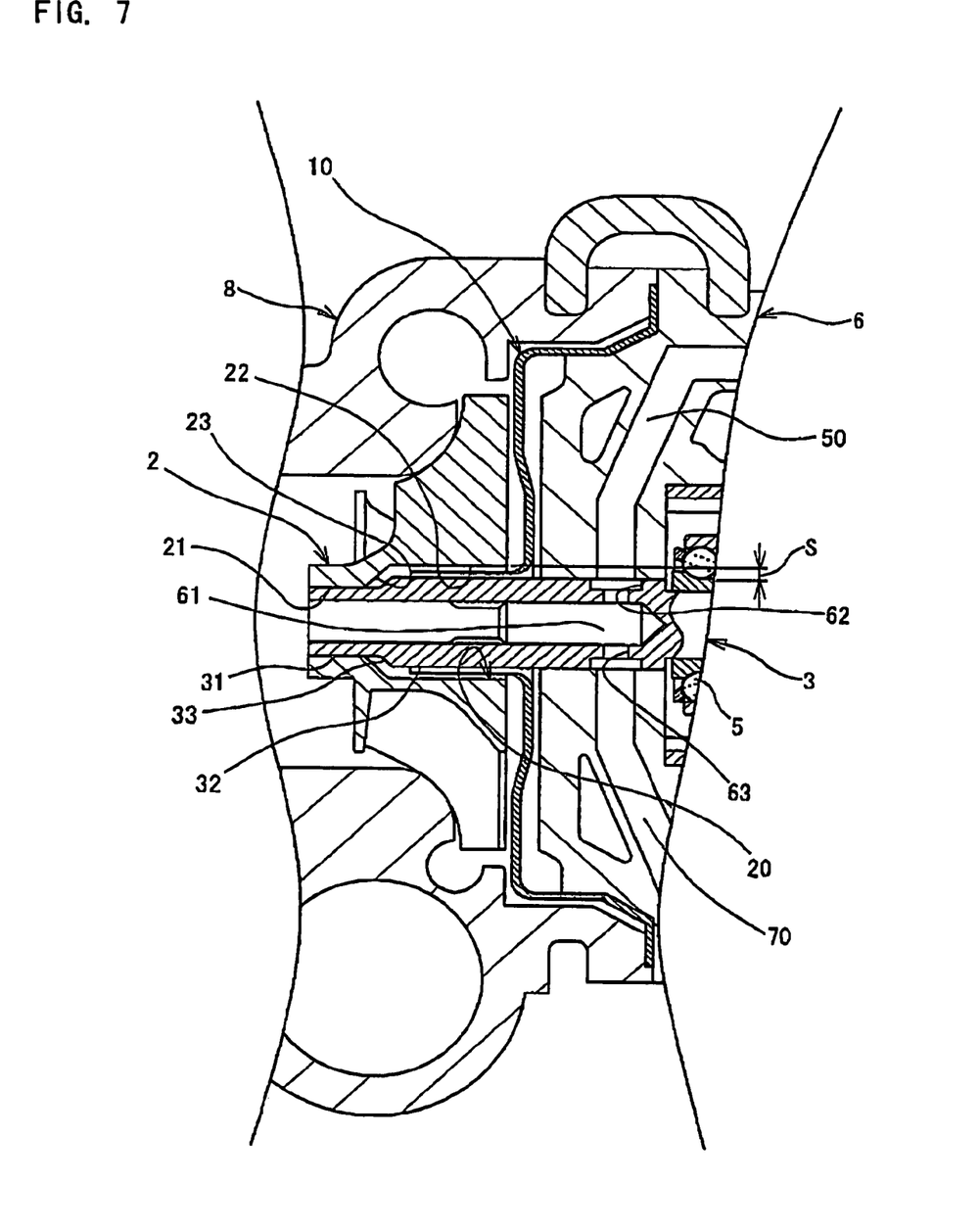
FIG. 7 is a sectional view of a major part of a modification of the supper charger according to the fourth embodiment of the invention.

Referring to the fourth embodiment, the introduction of compressed air is not limited to the illustrated configuration, and any configuration may be employed as long as compressed air can be guided to the turbine shaft. Although the turbine wheel 2 and the turbine shaft 3 are formed integrally with each other in the fourth embodiment, the turbine wheel 2 and the turbine shaft 3 may be provided as separate elements to form the cylindrical clearance S between the elements as seen in FIG. 7 similarly to the first embodiment.

What is claimed is:

1. A turbocharger comprising:
   a turbine wheel including a center hole coaxial with a rotation center thereof, the center hole including a shaft support portion;
   a turbine shaft inserted through the center hole, one end of the turbine shaft being secured to the shaft support portion;
   a bearing device that rotatably supports the turbine shaft;
   a bearing housing that houses the bearing device with the turbine wheel being exposed at one end surface in an axial direction thereof;
   a turbine housing secured to an end surface of the bearing housing in the axial direction to enclose the turbine wheel; and
   a heat shield member,
   wherein a cylindrical clearance is formed between the center hole and an outer circumferential surface of the turbine shaft, the clearance opening toward the bearing housing at one end thereof, and
   wherein the heat shield member includes a main body portion disposed between an end of the bearing housing in the axial direction and the turbine wheel to serve as a heat shield therebetween, and a cylindrical portion integrally formed with the main body portion so as to extend from the main body portion in the cylindrical clearance so as to cover an outside of the turbine shaft to serve as a heat shield between the turbine shaft and the turbine wheel.

2. The turbocharger according to claim 1, wherein an outer circumferential edge of the main body portion of the heat shield member is interposed between a peripheral part of one end surface of the bearing housing and a peripheral part of one end surface of the turbine housing.

3. The turbocharger according to claim 1, wherein a sleeve made of a material having a low thermal conductivity is interposed between the center hole and the outer circumferential surface of the turbine shaft.

4. The turbocharger according to claim 1, wherein a hole is formed at one end of the turbine shaft, the hole opening on the end surface of the turbine shaft and extending in an axial direction thereof.

5. The turbocharger according to claim 4, wherein a filler member comprising a material having a low thermal conductivity is fitted into the hole to fill the hole.

6. The turbocharger according to claim 1, wherein a gap is formed between the cylindrical portion and the turbine wheel.

7. The turbocharger according to claim 1, wherein a gap is formed between the cylindrical portion and the turbine shaft.

8. The turbocharger according to claim 1, wherein the cylindrical portion overlaps in an axial direction of the turbine shaft, a portion of the turbine wheel having the largest diameter thereof.

9. The turbocharger according to claim 3, wherein the sleeve is disposed on a radially outer periphery of the turbine shaft.

10. The turbocharger according to claim 1, wherein a radially inner circumferential surface of the cylindrical portion directly faces the outer circumferential surface of the turbine shaft.

11. The turbocharger according to claim 1, wherein the turbine shaft includes a small-diameter portion and a large-diameter portion with an inclined surface disposed therebetween.

12. The turbocharger according to claim 11, wherein the small-diameter portion is secured to the shaft support portion.

13. The turbocharger according to claim 12, wherein the cylindrical portion is disposed so as to extend from, in an axial direction of the turbine shaft, the main body portion of the heat shield member to a portion of the large-diameter portion disposed axially inward of the inclined surface.

* * * * *